US 8,448,967 B2

(12) United States Patent
Storer

(10) Patent No.: US 8,448,967 B2
(45) Date of Patent: May 28, 2013

(54) VEHICLE SIDE STEP

(75) Inventor: Ron Storer, Villa Park, CA (US)

(73) Assignee: Xtreme Metal Fab., Inc., Brea, CA (US)

( * ) Notice: Subject to any disclaimer, the term of this patent is extended or adjusted under 35 U.S.C. 154(b) by 521 days.

(21) Appl. No.: 12/692,796

(22) Filed: Jan. 25, 2010

(65) Prior Publication Data
US 2011/0181012 A1    Jul. 28, 2011

(51) Int. Cl.
*B60R 3/00* (2006.01)

(52) U.S. Cl.
USPC .......................................... 280/163; 280/169

(58) Field of Classification Search
USPC ... 280/163, 164.1, 164.2, 166, 169; 180/90.6; 296/193.05
See application file for complete search history.

(56) References Cited

U.S. PATENT DOCUMENTS

| | | | |
|---|---|---|---|
| 1,043,715 A | 11/1912 | Mitchell | |
| 1,212,572 A | 1/1917 | Sheridan | |
| D59,404 S | 10/1921 | Bergstrom | |
| 2,559,123 A | 7/1951 | Jackson | |
| 3,210,110 A | 10/1965 | Chieger | |
| D213,043 S | 12/1968 | Crepeau | |
| 4,017,093 A * | 4/1977 | Stecker, Sr. | 280/163 |
| 4,200,303 A | 4/1980 | Kelly | |
| 4,610,458 A | 9/1986 | Garnham | |
| 4,639,039 A | 1/1987 | Donovan | |
| D293,667 S | 1/1988 | Weiler | |
| 4,749,191 A | 6/1988 | Gipson et al. | |
| D306,278 S | 2/1990 | Hafvenstein | |
| 4,935,638 A | 6/1990 | Straka | |
| 4,943,085 A | 7/1990 | Straka | |
| 4,976,455 A | 12/1990 | Brammer | |
| 5,046,582 A | 9/1991 | Albrecht | |
| 5,137,293 A | 8/1992 | Graves et al. | |
| 5,193,829 A | 3/1993 | Holloway et al. | |
| 5,265,896 A * | 11/1993 | Kravitz | 280/163 |
| 5,286,049 A * | 2/1994 | Khan | 280/163 |
| 5,511,750 A | 4/1996 | Evenson | |
| 5,732,996 A | 3/1998 | Graffy et al. | |
| D395,268 S | 6/1998 | Tucker | |
| 5,895,064 A | 4/1999 | Laubach | |
| D416,831 S | 11/1999 | Negri | |
| 6,017,045 A | 1/2000 | Dermody | |
| D424,006 S | 5/2000 | Lemieux et al. | |
| D437,818 S | 2/2001 | Mothersele | |
| D440,931 S | 4/2001 | Knight, III et al. | |

(Continued)

FOREIGN PATENT DOCUMENTS

| EP | 0173227 | 3/1986 |
|---|---|---|
| EP | 0210465 | 2/1987 |

*Primary Examiner* — Frank Vanaman

(74) *Attorney, Agent, or Firm* — Stetina Brunda Garred & Brucker

(57) ABSTRACT

A step assembly for a vehicle comprising an elongated main body having a substantially straight portion and two end portions; a generally U-shaped step bar having a substantially straight portion parallel to the main body and two bent portions, the bent portions welded to the main body and a step surface having a plurality of apertures that is affixed to the step bar to provide traction to the user. The main body is preferably welded to at least one support bracket. The installation of the step assembly is a two step process that comprises engagably attaching at least one mounting bracket to a vehicle and then engagably attaching the support bracket, which is preferably welded to the main body, to the mounting bracket.

19 Claims, 2 Drawing Sheets

U.S. PATENT DOCUMENTS

| | | |
|---|---|---|
| 6,422,342 B1 | 7/2002 | Armstrong et al. |
| 6,435,534 B1 | 8/2002 | Stone |
| 6,533,302 B2 | 3/2003 | Scruggs et al. |
| D474,435 S | 5/2003 | Lund et al. |
| D488,759 S | 4/2004 | Hattori et al. |
| 6,726,230 B2 * | 4/2004 | Weir .................... 280/163 |
| D495,283 S | 8/2004 | Ashley et al. |
| 6,874,801 B2 | 4/2005 | Fichter |
| D513,398 S | 1/2006 | Kozak et al. |
| 7,044,487 B2 | 5/2006 | Byrne |
| D528,057 S | 9/2006 | Goldstein |
| D532,354 S | 11/2006 | Storer |
| 7,168,721 B2 | 1/2007 | Mulder |
| D545,747 S | 7/2007 | Storer |
| D546,745 S | 7/2007 | Storer |
| 7,731,212 B2 * | 6/2010 | Storer .................... 280/163 |
| 2011/0181012 A1 * | 7/2011 | Storer .................... 280/169 |

* cited by examiner

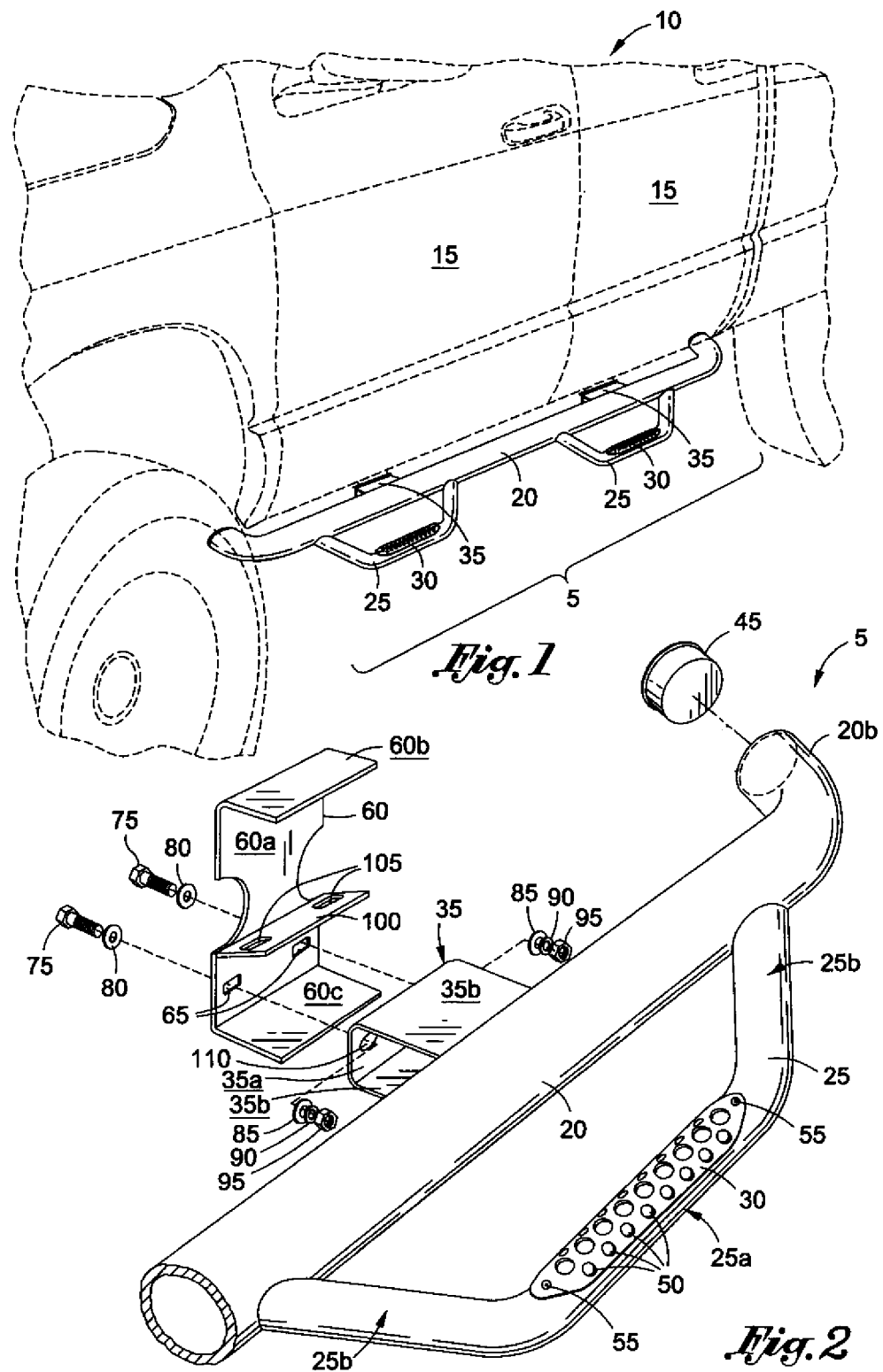

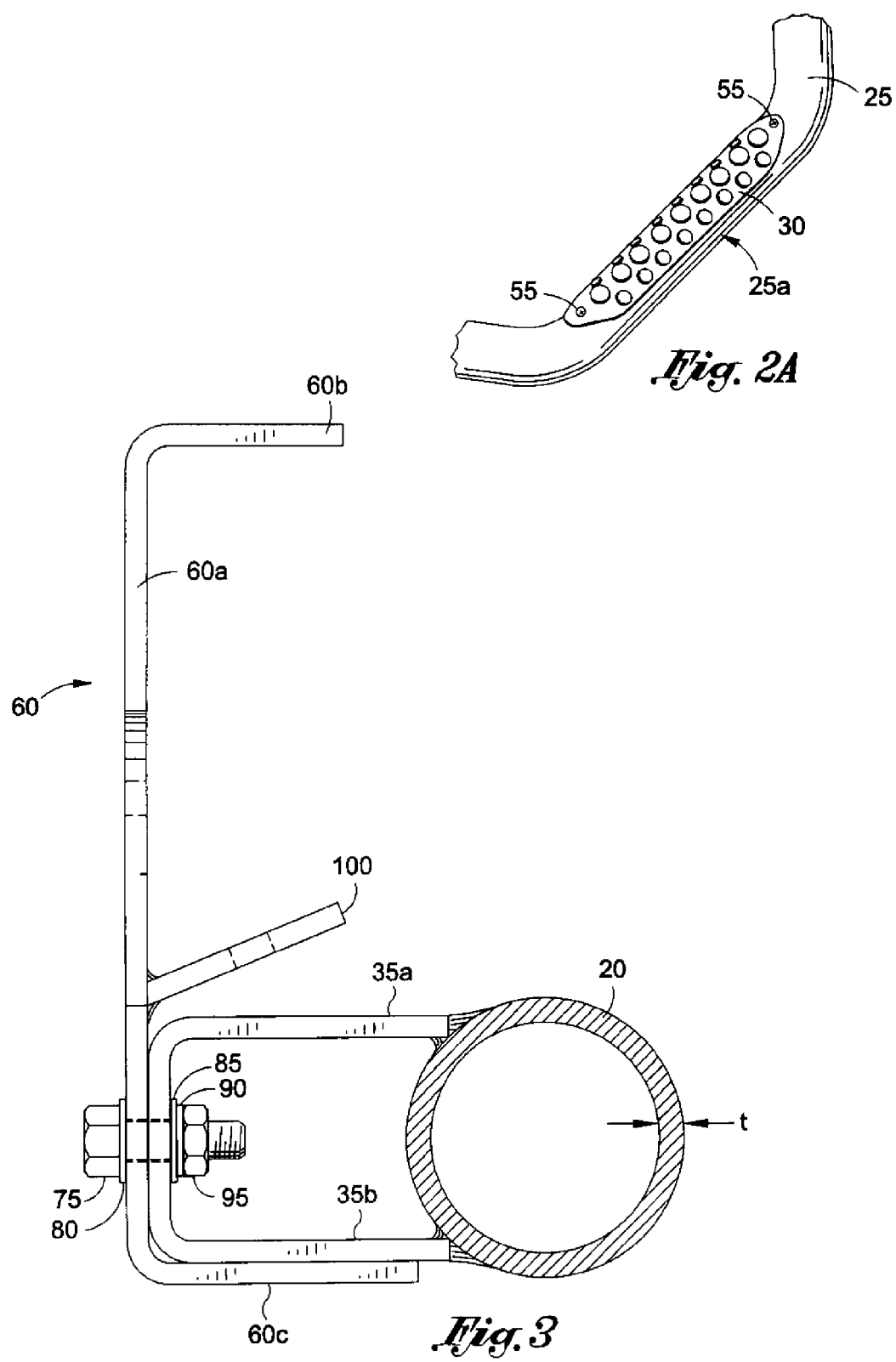

VEHICLE SIDE STEP

CROSS-REFERENCE TO RELATED APPLICATIONS

The present application is a continuation of U.S. patent application Ser. No. 12/291,413 entitled VEHICLE SIDE STEP filed Nov. 10, 2008, which is a continuation of U.S. patent application Ser. No. 11/602,800 entitled VEHICLE SIDE STEP filed Nov. 21, 2006, the entirety of the disclosure of which of which are expressly incorporated herein by reference.

STATEMENT RE: FEDERALLY SPONSORED RESEARCH/DEVELOPMENT

Not Applicable

BACKGROUND

The present invention relates generally to a vehicle accessory and more specifically to a vehicular side step and its method of installation.

A side step is a common accessory on a number of vehicles, such as a pick-up truck, a sports utility vehicle, a large utility truck or a jeep. The side step is multi-purpose in that it can be used for appearance and/or protection of the vehicle. For example, a side step may provide protection to both the door and side of the vehicle. Specifically, certain vehicles are commonly used for off-road activities, which often involve maneuvering through all types of conditions including dirt, uneven terrain, mud, bodies of water, snow and ice. Driving through these conditions may cause debris, such as dirt, rocks and other particles to be projected onto the vehicle causing dents, nicks and other similar damage both to the vehicle and paint. A side step may deflect the various types of debris before contact is made with the vehicle.

In addition, a vehicle that is utilized for off-road activities may have an elevated chassis to prevent the possibility of damage to the underside of the vehicle. In general, any elevated vehicle having a high road clearance may present difficulty to an individual when exiting and entering the passenger compartment. Many vehicles having an elevated chassis are equipped with some form of an externally mounted step assembly, for example, a side board, a running board, a side step or a side bar onto which a person may step or stand in an attempt to access the passenger compartment.

Finally, a step assembly may be attached to the side of a vehicle for appearance purposes. Many vehicle owners choose to install an externally mounted step assembly to enhance the appearance of the vehicle. In particular owners who display their vehicles at shows or use the vehicle for activities such as racing often add a step assembly to impart a certain character to the vehicle.

With regard to the installation of a step assembly, each of the identified step assemblies are constructed in such a manner that makes installation difficult and cumbersome. The process of installation generally requires two individuals because a step assembly is usually a one-piece large, bulky article. Specifically, one person is required to hold the step assembly while the other person prepares the vehicle for attachment of the assembly so that the installation is precise.

In addition, many step assemblies include a stepping surface. The stepping surface generally takes the form of a rubber pad that is affixed to the step portion of the step assembly. One disadvantage of the convention rubber material from which a step surface is typically constructed is that the material often deteriorates quickly. Specifically, if a vehicle is utilized for off-road purposes, the vehicle may encounter a wide variety of environmental conditions, including heat, moisture, snow, ice and rain. Moreover, depending on the geographic location of the vehicle, extreme environmental conditions, such as in the desert or in subzero temperatures, may be the norm rather than an exception. Thus, a stepping surface constructed from rubber or other similar material may become weakened and tear, rip or erode.

A need exists for a step assembly for a vehicle that is easy to install. The step assembly should have a simple construction so that only one person is required for installation. The step assembly should be strong and durable and further provide an appropriate stepping surface that is not affected by normal weather conditions and use. In addition, the stepping surface should not easily deteriorate.

BRIEF SUMMARY

A step assembly for a vehicle is disclosed that comprises an elongated main body having a substantially straight portion and two end portions; a generally U-shaped step bar having a substantially straight portion that is parallel to the main body and two bent portions, the bent portions may be welded to the main body at an angle relative to the horizontal; a step surface affixed to the step bar, the step surface having a plurality of apertures that provide traction for the user; at least one support bracket, wherein the support bracket has a base portion having at least one aperture and two arm portions extending therefrom, the support bracket being welded to the main body along the edge of each arm distal from the base; at least one mounting bracket, wherein the mounting bracket has a base further having a first and second arm extending therefrom, a flange welded to the base and having at least one aperture for attachment to the vehicle and at least one aperture in the portion of the base defined by the flange and the second arm for attachment to the support bracket. The installation of the vehicle is a two-step process that comprises engageably attaching the mounting bracket to the vehicle by the flange and then engageably attaching the support bracket, which is welded to the main body, to the mounting bracket. The installation process may only require one person because of the construction of the step assembly. Drilling is not required on most vehicles and the installation of the step assembly on the vehicle may be completed by using a wrench or socket wrench.

The end portions of the main body are bent at substantially a 45 degree angle and extend underneath the vehicle so that the main body does not become caught on objects. At least one end cap may be engaged with an end portion of the main body. The main body, the step bar and the step surface may be constructed from any appropriate material that is durable and resistant to weather, corrosion, cracking and other types of wear normally associated with use, including without limitation, aluminum, steel, stainless steel and titanium. The apertures of the step surface may any shape, including circular, oval and rectangular.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a side perspective view of a step assembly installed on a vehicle.

FIG. 2 is an exploded view of the components comprising a step assembly, including a main body, a step bar, a support bracket and a mounting bracket.

FIG. 2A is a perspective view of the step bar with a raised surface feature.

FIG. 3 is a cross sectional view of the main body, the support bracket and a mounting bracket shown in FIG. 2.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are intended to be encompassed within the scope of the invention.

FIG. 1 represents a side view of a typical installation of an exemplary embodiment of a step assembly 5 illustrated generally to include a main body 20, at least one step bar 25, a step surface 30 affixed to the step bar 25, at least one support bracket 35 and at least one mounting bracket (not shown). The step bar 25 is preferably welded to the main body 20 which is further welded to at least one support bracket 35. The support bracket 35 is adapted to be engaged to a mounting bracket (not shown), as described with respect to FIG. 2. Although only two support brackets 35 are shown in FIG. 1, any number of support brackets 35 may be utilized to provide the necessary support and stability to the step assembly 5.

In FIG. 1, the step assembly 5 is represented as being coupled to a vehicle 10 having a high road clearance. The step assembly 5 may provide access to the inside passenger compartment of the vehicle 10 by providing a support for stepping. Specifically, the step bar 25, has a lower elevation than the opening of the passenger compartment of the vehicle, which provides easy access to the door 15 of the passenger compartment. It should be apparent to one skilled in the art that the vehicle 10 represented in FIG. 1 is merely exemplary and the teachings herein are equally applicable to other types of vehicles 10.

FIG. 2 represents the step assembly 5 in greater detail in an exploded view illustrating the manner of engagement between the various components of the completed step assembly 5. The main body 20 is formed from a generally cylindrical tube member having a circular cross-section. The cross-section is preferably circular because the shape is less likely to be affected by vibration, stress and pressure during use of the step assembly 5. The main body 20 is an elongated member having a substantially straight portion 20a and two end portions 20b with each end portion 20b bent at approximately a 45-degree angle. The main body 20 has a preferred diameter of 1½ inches to 2 inches. However, alternative sizes are additionally contemplated. It should be apparent to one skilled in the art that these measurements may vary depending on the vehicle to which the step assembly 5 is attached. The main body 20 is generally hollow; however, the main body 20 may be a substantially continuous body of solid material. To enhance the tubular appearance and prevent dirt and other debris from entering the hollow of the main body 20, the step assembly 5 includes at least one end cap 45 that is frictionally engaged to the main body 20 in an opening located at each end portion 20b of the main body 20. The end cap 45 may be any material that can withstand normal wear and tear associated with the use of a vehicle. An exemplary end cap may be of the type sold by Caplugs of Buffalo, N.Y.

The main body 20 generally extends along the length of the passenger cab, as shown in FIG. 1, and each end portion 20b extends underneath the vehicle so that the main body 20 does not become caught on objects. It can be appreciated that the main body 20 may be cut to any desired length that can provide the necessary support during the use of the step assembly 5. Upon installation, the main body 20 of the step assembly 5 is generally positioned at or below the elevation of the door 15 to the passenger compartment of the vehicle 10. The main body 20 functions as a protective guard for the exterior of the vehicle on which it is mounted, as described herein. The main body 20 further serves as a stable platform for the attachment of the step bar 25.

A step bar 25 is attached to the main body 20 of the step assembly 5. The step bar 25 may be a U-shaped cylindrical tube member having a generally circular cross-section. In one exemplary embodiment, the step bar 25 has a diameter of 1 inch and/or 1½ inches but other sizes are contemplated herein. Similar to the main body 20, it should be apparent to one skilled in the art that these exact measurements may vary depending on the vehicle to which the step assembly is attached. Although the step bar 25 is generally hollow, the step bar 25 may be formed from a substantially continuous body of solid material. The step bar 25 has a substantially straight portion 25a that runs generally parallel to the main bar 20 and two bent portions 25b. The angles of the bent portions 25b are relative to the straight portion 25a and may be one of any variety of angles that facilitate easy access by a human foot. The two bent portions 25b of each step bar 25 may be of different angles, depending on the criteria of use and/or the vehicle upon which it is installed.

A step bar 25 is preferably provided at approximately the location of each door 15 of the vehicle 10, as shown in FIG. 1. The vehicle 10 in FIG. 1 is a four door vehicle and shown on one side fitted with a step assembly 5 having side bars 25 located relative to each door 15. Each side bar 25 is positioned so that so that a passenger can enter or exit the vehicle using the step bar 25. Specifically, in FIG. 1, the step bar 25 is positioned below and generally centrally with respect to both the front door and the rear door of the vehicle 10. The step assembly 5 can be adapted for any type of vehicle 10 regardless of the number of doors. Thus, a vehicle having two doors may have a step assembly 5 with a step bar 25 preferably positioned and generally centered below each of the two doors 15 of the vehicle 10 so that a passenger may enter and exit the vehicle with relative ease. A step assembly 5 may also be located behind a rear door to permit access to the bed of a truck or a step assembly 5 may also be located near the door opening of a mini-cab.

The step bar 25 is attached to the main body at the end of each bent portion 25b preferably by welding, although other conventional forms of connectivity are contemplated, such as bolts, screws, brazing or other means known in the art. The step bar 25 is welded to the main bar at an angle relative to the horizontal that is appropriate to assist in entering and exiting the vehicle. The angle of the weld may be anywhere from zero to ninety degrees relative to the horizontal plane depending on the ground clearance of the vehicle and/or the particular type of vehicle or the vehicle's normal use. The main body 20 and the step bar 25 are preferably constructed from an appropriately strong and durable material, including without limitation aluminum, steel and titanium. The material selected for construction of the main body 20 and the step bar 25 should be resistant to weather, corrosion and other types of wear commonly associated with use, such as bending due to the application of weight on or against the step assembly 5.

A step surface 30 is provided on each step bar 25 (see FIGS. 2 and 2A). The step surface 30 provides a surface that increases the friction between a user and the step bar 25 for improved traction. Specifically, the step surface 30 has a plurality of apertures 50 that provide traction to the user in the form of a slip resistant stepping surface. The apertures 50 may be any shape, including without limitation, circular, oval, square and rectangular. The apertures 50 may be random or the apertures may form a design. The apertures 50 may each be equal in size or the apertures may be of varying size. The step surface 30 may also comprise other types of texture, such as raised surface features.

The step surface 30 may be generally constructed from a formed metal material that is strong and durable, such as aluminum, although other materials may be appropriate, including without limitation aluminum, steel, stainless steel, plastic, rubber and titanium. The material should be resistant to weathering, corrosion, cracking and other types of wear commonly associated with use. The step surface 30 is formed to conform to the shape of the step bar 25 and is affixed by screws and the like, as further described in FIG. 2. The step surface 30 is contoured generally to be affixed to the rounded surface of the step bar 25 by at least one bolt placed in a pre-drilled hole 55 of the step assembly 5.

As previously described with respect to FIG. 1, the step bar 25 is weldably affixed to the main body 20 and the main body 20 is further engaged to at least one support bracket 35. The support bracket 35 is a U-shaped member having a base portion 35a and two arm portions 35b extending therefrom. The edges of the arm portions 35b located along the open end of the support bracket 35 are preferably welded to the main body 20, as shown in FIG. 2. The base portion 35a or attachment plate of the support bracket 35 is provided with at least one pre-drilled support bracket aperture for attachment to a mounting bracket 60.

In the exemplary embodiment shown in FIG. 2, the mounting bracket 60 is a U-shaped member having a base 60a and a first and second arm 60b, 60c extending therefrom. As is apparent from the drawings, the second arm 60c defines a shelf configured to support the support bracket 35. As shown in FIG. 2, the base 60a may include a base plate having various notches and cutouts along each elongated side between the first and second arms 60b, 60c, to accommodate installation on any vehicle and provide clearance for the use of tools during installation, as further described herein. The mounting bracket 60 is constructed to be engaged to the underside of the passenger cab or other portion of the vehicle. Specifically, a flange 100 having at least one aperture 105 is welded to the base 60a below any notch or cut-out area. As shown in FIG. 2, the flange 100 may be welded at any angle relative to the base 60a that is appropriate for attachment to the particular vehicle on which the step assembly 5 is installed. As is apparent from FIGS. 1 and 2, one embodiment of the mounting bracket 60 is designed for attachment to a lateral end portion of the underside of a vehicle. In this manner, the underside of the vehicle may include a chassis or frame member disposed adjacent a lateral end portion of the vehicle which the mounting bracket 60 may be attached to. In this manner, the support bracket 35 does not extend too far from the mounting bracket 60. If the mounting bracket 60 is mounted in a more medial position relative to the lateral side of the vehicle, the support bracket 35 would have to extend to the lateral side of the vehicle in order to dispose the main body 20 underneath a side door 15. In such a configuration, the weight of the main body 20 would generate large forces (moment forces or torque) on the mounting bracket. The base 60a of the mounting bracket 60 further has at least one aperture 65 within the area defined by the flange 100 and the second arm 60c. It can be appreciated by one skilled in the art that the mounting bracket 60 may be modified depending on the vehicle on which the step assembly is mounted.

Referring to FIG. 3, the mounting configuration of the main body 20 is shown in cross-sectional detail. The tubular wall thickness of the main body 20 is shown by t. As shown in FIG. 3, the components for installation comprise two main pieces including the mounting bracket 60 and the support bracket 35 which is weldably attached to the main body 20 which is further weldably attached to the step bar (not shown). During the installation process, which may only require one person, the mounting bracket 60 is first installed on the vehicle. In one embodiment the flange 100 of the mounting bracket 60 is attached to the bottom of the lower body pinch mold of the vehicle by any appropriate form of attachment including bolts and screws which are passed through the at least one aperture of the flange 100 into cooperating nuts, and washers. Next, the support bracket 35 is affixed to the mounting bracket 60 in the area defined by the flange and the second arm 60c. The shelf 60c may support the support bracket 35 during installation to allow the support bracket 35 to be mounted by one person. Referring to FIGS. 2 and 3, a bolt 75 is threadably passed through a washer 80, the mounting bracket aperture 65, the support bracket aperture 110 and through a second washer 85, a third washer of smaller diameter 90 and finally into a nut 95. When the user steps onto the step surface of the step assembly, additional support is provided when the first arm 60b of the mounting bracket pushes against an adjacent portion of the underside of the vehicle.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A step assembly for mounting to a vehicle, the step assembly comprising:
   an elongated main body having a substantially straight portion and two end portions;
   a generally U-shaped step bar having a substantially straight portion that is parallel to the main body and two bent portions welded to the main body;
   a step surface affixed to the step bar, the step surface having a plurality of apertures for providing traction for the user;
   at least one support bracket, wherein the support bracket includes a base portion having at least one aperture and two arm portions extending therefrom, the support bracket being welded to the main body along the edge of each arm distal from the base;
   at least one mounting bracket, wherein the mounting bracket includes a base having a first and second arm extending therefrom, a flange welded to the base and having at least one aperture for attachment to the vehicle and at least one aperture in the portion of the base defined by the flange and the second arm far attachment to the support bracket, the second arm being sized and configured to receive the support bracket and support a load applied by the support bracket;

wherein installation of the step assembly is a two step process that comprises engagably attaching the mounting bracket to the vehicle by the flange and then engagably attaching the support bracket to the mounting bracket.

2. The step assembly of claim 1, wherein the end portions are bent at substantially a 90 degree angle.

3. The step assembly of claim 1, wherein the main body has a circular cross-section.

4. The step assembly of claim 1, further comprising at least one end cap engaged with an end portion of the main body.

5. The step assembly of claim 1, wherein the main body extends along the length of a passenger cab of the vehicle and at least one portion extends underneath the vehicle.

6. The step assembly of claim 1, where the main body is constructed from one of aluminum, steel and titanium.

7. The step assembly of claim 1, wherein the step bar is constructed from one of aluminum, steel and titanium.

8. The step assembly of claim 1, wherein the bent portions of the step bar are at different angles.

9. The step assembly of claim 1, wherein the bent portions are welded to the main body at an angle relative to the horizontal.

10. The step assembly of claim 1, wherein the step surface is constructed from aluminum.

11. The step assembly of claim 1, wherein the apertures of the step surface have one of a circular, oval, square and rectangular shape.

12. The step assembly of claim 1, wherein the step surface includes raised surface features.

13. The step assembly of claim 1, wherein the flange is welded at an angle to the base of the mounting bracket.

14. The step assembly of claim 1, wherein the first arm is sized and configured to be disposed in contact with a portion of an underside of the vehicle when the mounting bracket is connected to the vehicle.

15. The step assembly of claim 14, wherein the second arm is disposed in spaced relation to the vehicle when the mounting bracket is attached to the vehicle.

16. The step assembly of claim 15, wherein the second arm extends substantially orthogonally front the base.

17. A step assembly for mounting to a vehicle, the step assembly comprising:
  an elongated main body having a substantially straight portion and two end portions;
  at least one support bracket, wherein the support bracket includes a base portion having at least one aperture and two arm portions extending therefrom, the support bracket being welded to the main body along the edge of each arm distal from the base;
  at least one mounting bracket, wherein the mounting bracket includes a base having a first and second arm extending therefrom, a flange welded to the base and having at least one aperture for attachment to the vehicle and at least one aperture in the portion of the base defined by the flange and the second arm for attachment to the support bracket, the second arm being sized and configured to receive the support bracket and support a load applied by the support bracket;
  wherein installation of the step assembly is a two step process that comprises engagably attaching the mounting bracket to the vehicle by the flange and then engagably attaching the support bracket to the mounting bracket.

18. The step assembly of claim 17, wherein the first arm is sized and configured to be disposed in contact with a portion of an underside of the vehicle when the mounting bracket is connected to the vehicle.

19. The step assembly of claim 17, further comprising a generally U-shaped step bar having a substantially straight portion that is parallel to the main body and two bent portions welded to the main body.

* * * * *